Sept. 20, 1971   W. C. BLYTHING   3,605,550
METHOD AND APPARATUS FOR CUTTING GEARS
USING A GEAR SHAPED CUTTER Filed Aug. 28, 1969   2 Sheets-Sheet 1

Sept. 20, 1971 W. C. BLYTHING 3,605,550
METHOD AND APPARATUS FOR CUTTING GEARS
USING A GEAR SHAPED CUTTER
Filed Aug. 28, 1969 2 Sheets-Sheet 2

William Charles Blything
by Kenway, Jenney & Hildreth
Att'ys.

This invention relates to rotary positive displacement

United States Patent Office 3,605,550
Patented Sept. 20, 1971

3,605,550
METHOD AND APPARATUS FOR CUTTING GEARS USING A GEAR SHAPED CUTTER
William Charles Blything, 37 Pendragon Road,
Perry Barr, Birmingham, England
Filed Aug. 28, 1969, Ser. No. 853,857
Claims priority, application Great Britain, Sept. 5, 1968,
42,174/68
Int. Cl. B23f 5/12
U.S. Cl. 90—7      8 Claims

ABSTRACT OF THE DISCLOSURE

Method and apparatus for forming the teeth of a rotary positive displacement unit which enables production on a substantial scale. The unit comprises two members, each provided with teeth, one more tooth being provided on one member than on the other member. The method and apparatus involve employing a cutting tool cut to the same form as that of the first member and running the cutting tool in contact with a blank to form the second member such that the cutting tool and blank rotate relatively to each other while tilted relatively to each other with a swash plate motion corresponding exactly with the relative motion between the two members of the rotary positive displacement unit.

BACKGROUND

This invention relates to rotary positive displacement units. More specifically this invention relates to a method of forming toothed rotors of rotary positive displacement units of the kind comprising a first toothed member having a first series of regularly spaced radially extending teeth on one face thereof and a second toothed member having a second series of regularly spaced radially extending teeth on one face thereof, there being one more tooth on one member than on the other member, and means for rotating one member relatively to the other with a swash plate motion, whereby the teeth alternately mesh together and move out of mesh to produce a cyclic variation of the volumes between the teeth of the positive displacement unit.

One positive displacement unit of this general nature is described by way of example in patent specification No. 1,099,085.

There are normally severe practical difficulties involved in the design and production of suitable intermeshing teeth, in a way which is practical for production on a substantial scale at reasonable cost.

The invention is particularly concerned with a form of tooth and a method of manufacturing the teeth which are readily adaptable to allow production on a substantial scale.

A primary object of the present invention is to provide a simple and accurate manufacturing technique for a toothed rotor of a rotary positive displacement unit of the kind in which two toothed members, one member with one more tooth than the other member, rotate relatively to each other with a superimposed relative tilting action corresponding to a swash plate motion and with the teeth of one member in mesh with the teeth of the other member.

In contrast to the known procedure of trying to calculate accurately the appropriate forms for the teeth to permit them to mesh together accurately, in accordance with the present invention one of the toothed members is cut to a simple readily machinable shape and the second toothed member is then formed to the appropriate mating shape by running the second toothed member in contact with a cutting tool corresponding exactly in shape to the first toothed member, the relative motion between the cutting tool and the second toothed member corresponding to the desired motion of the first and second toothed members in a rotary positive displacement unit. In general the form of the teeth of the second toothed member will be quite distinct from the form of the teeth of the first toothed member, but this is not of consequence provided the two toothed members will mesh accurately together.

Thus the present invention is associated with three quite distinct toothed members. The first of these is a first toothed member of the rotary positive displacement unit and this can be formed by any suitable conventional machining process. The manufacture of this first component does not directly form part of the present invention.

The second component is a cutting tool corresponding exactly in shape to the first component mentioned above. It is necessary to provide a cutting tool as a separate component rather than using the first toothed member itself as a cutting tool, because in practice the first toothed member is made of a material which is not sufficiently wear-resistant to enable it to be used as a cutting tool.

The third component is the second toothed member and it is this component with which the invention is most closely concerned. Instead of utilizing a known but exceptionally complicated calculating technique to derive the complex shape of the second toothed member and then attempting to control a machine tool to cut a second toothed member to the desired complicated form, the second toothed member is simply cut to its desired shape by running it in mesh with the cutting tool so that the cutting tool cuts it to the desired shape. Thus it is never necessary to define the analytical form of the teeth of the second toothed member.

A rotary positive displacement unit having teeth formed by the method of the present invention may be intended for use as either a pump or a motor or as a fluid coupling. The basic essential of the present invention is the utilization of a cutting tool corresponding in shape to a first toothed member, the cutting tool running in mesh with a blank to form the second toothed member to its desired meshing shape.

DESCRIPTION OF THE DRAWINGS

Various structural embodiments and methods in accordance with the invention will now be described with reference to the accompanying drawings in which:

Referring now to FIG. 1, there is shown a pump in accordance with the present invention, said pump incorporating an inlet casing 9, an outlet casing 10 and a shaft housing 11. The inlet housing contains a first stationary toothed member 3 which is secured herein by means of a nut and belt assembly 61. The stationary toothed member incorporates a series of one-way inlet valves 50, each of which communicates between an inlet port 1 and a space to be described between adjacent teeth of the toothed member 3.

Figure 1:
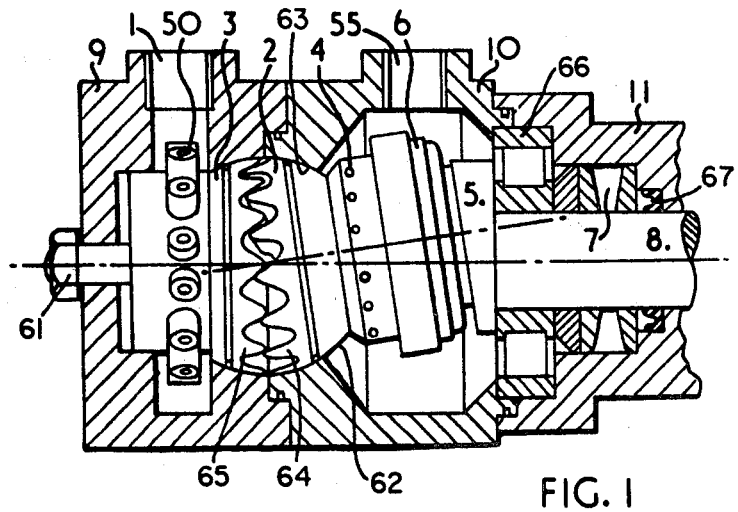
FIG. 1 is a part section of a unit with a drive input shaft and inlet and outlet ports for use as a fluid pump.

A second toothed member 2 incorporates a part-spherical rear face 62 and seats against a mating part-spherical rear face 63 formed in the outlet casing 10. The outlet casing 10 is secured to the inlet casing 9 in such a manner that teeth 64 of the toothed member 2 mesh with corresponding teeth 65 formed on the toothed member 3. The rotary toothed member 2 incorporates outlet valves 4, which communicate between spaces between adjacent teeth 64 and an outlet port 55.

The shaft housing 11 is secured to the outlet casing 10 in any convenient manner and supports a shaft 8 by means of a bearing 66 and a thrust spacer 7. A shaft seal 67 is also provided to seal the shaft opening against egress of fluid.

The shaft 8 carries at its inner end a swash plate 5 which is rotatable with the shaft 8. The swash plate 5 is coupled by means of a bearing 6 to the rear face of the rotary toothed member 4.

In operation the shaft 8 is rotated and this imparts a swash plate type rotary tilting movement to the rotary toothed member 4. This motion, in conjunction with the inter-engagement of the teeth 64 and 65, there being one less tooth 65 than there are teeth 64, causes a simultaneous bodily rotation of the rotary toothed member 2 with a swash plate action in a manner well-known in the art. During this combined tilting and rotating action the spaces between teeth 64 and teeth 65 alternately increase and decrease in volume, also in a manner well-known in the art. As these spaces are increasing in volume fluid is drawn in through an inlet valve 50 and thereafter as the volume decreases the fluid is forced out under pressure through an associated outlet valve 4. In this way continuous rotation of the shaft 8 results in a continuous circulation of fluid from the inlet 1 to the outlet 55.

Figure 2:
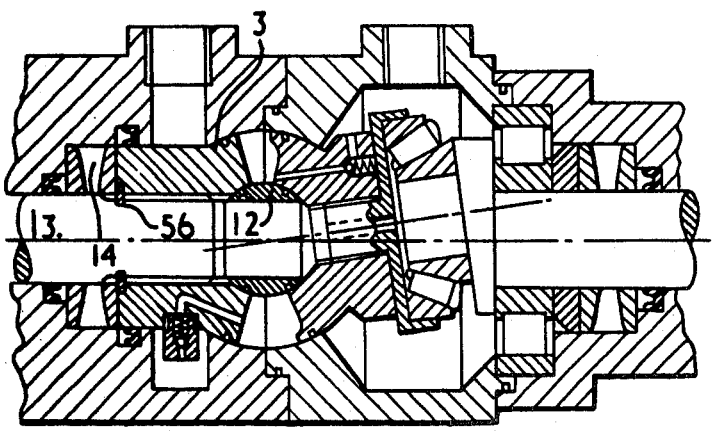
FIG. 2 is a longitudinal section of a unit showing the arrangement necessary to include an output shaft for use as a fluid coupling, the valves necessary are also shown.

FIG. 2 shows an example of a fluid coupling wherein the second disc 3 has been mounted to allow rotation. The passage of fluid through the unit is the same as that in the pump shown in FIG. 1 except that fluid can pass through an aperture in a centre sealing ring 12 and a splined shaft 13 to a compartment housing the thrust pad 14 which is sealed against escape of fluid. A manually operated tap/valve (not shown) may be incorporated to drain this compartment at intervals so to avoid stagnation of fluid.

To avoid end thrust on the splined output shaft 13 a circlip 56 may be fitted.

Thus FIGS. 1 and 2 show two alternative forms of rotary positive displacement unit in accordance with the invention incorporating pairs of toothed members which are formed in a manner which will be described below.

The toothed members may have teeth which are quite distinct from each other, the first having teeth which are machined to a simple shape and the second having teeth formed to mesh with but not in general to be identical with the teeth of the first toothed member. It is unnecessary to give detailed consideration to the form of the teeth of the second toothed member because at no time is it necessary to derive or utilize the theoretical shape of these teeth. In order to distinguish the first toothed member such as 3 of FIG. 1 from the second toothed member such as 2 of FIG. 1 in the following description they will be referred to as the machined disc or member and the mating disc or member respectively and their teeth will be referred to as teeth and lobes respectively.

The general geometry and method of manufacture of the machined disc and of the cutting tool will now be described. As both of these devices have the same form, reference to geometry or manufacture of one of these devices should also imply corresponding reference to the other devices. This operation can be carried out by entirely conventional techniques and for this reason a detailed explanation and illustration is not considered necessary.

The machined teeth are assumed to be straight flanked with pointed apices and pointed roots. However, for purposes of strength, the apices are in fact given a substantial radius and the roots are also given a substantial radius because the root portion of the teeth is not used in practice. These teeth may be given any convenient angle consistent with sufficient tooth strength. These teeth extend both above and below a common centre about which the swash plate type motion takes place.

The basic manufacture of the teeth is carried out by a straight flanked cutter with the flanks inclined at an angle corresponding to the tooth angle. The apex of the cutter is given a radius to correspond to the desired radius at the root of the teeth. In order to ensure that all the working faces of the teeth lie on radial lines extending from a single central point in space or common centre, the cutter should be operated such that the theoretical apex thereof moves in a straight line towards the common centre. The cutter or the blank for the toothed disc is of course indexed in order to enable all the teeth around the periphery of the toothed disc to be cut.

Figure 5:
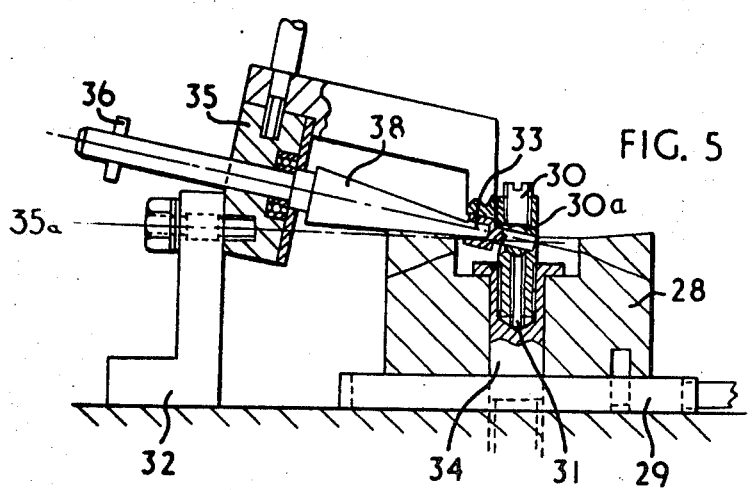
FIG. 5 is a part section showing a part of the manufacturing equipment for producing a radiused profile to the machined teeth.

FIG. 5 of the accompanying drawings shows a suitable apparatus whereby a radius may be imparted to the apices of the teeth. The partially formed blank 28 is mounted on an indexing table 29 by means of a post 34. The post 34 supports a centring device 31 by means of which a ball member 30a may be positioned at the common centre and maintained in position by a screw 30. The ball member 30a supports a socket member 33 which in turn supports the inner end of a frusto-conical cutting tool 38. This tool 38 is mounted for example by means of ball bearings in a pivotal block 35. The block 35 is pivotal about an axis 35a on a post 32 and it should be observed that axis 35a passes through the common centre. In use, the cutting tool is rotated through a drive coupling 36 and the block 35 is rocked about axis 35a in order to cause the tool 38 to form a radius on the apex of a tooth.

After one tooth has been formed the table 29 is indexed so that the other teeth in turn may be radiused in the same way.

Figure 3:
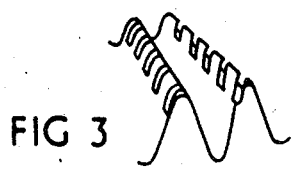
FIG. 3 is a view of the teeth of the cutting tool with slots to facilitate cutting of the mating disc for use in a method according to the invention.

Although the above description has referred specifically to a toothed disc, it should be understood that the cutting tool for the mating disc is formed in substantially the same way. The primary differences are that the cutting tool should be formed from a suitable tool steel and that once it has been formed to the shape of the machined disc it should be serrated as shown in FIG. 3 in order to form it into a suitable cutting tool.

The method of manufacture of the mating disc will now be described. This method of manufacturing the mating disc forms the essential basis of the invention.

Although the primary feature of the invention is that the final accurate form of the mating disc should be formed from the above described cutting tool, in order to prevent the requirement for an excessive amount of material to be removed by the cutting tool it is advantageous to first of all remove as much metal as is practicable by a simple conventional machining operation to form rough cut teeth leaving the cutting tool described above the task of forming the rough cut teeth to the desired form. This rough cutting may if desired utilize the same technique as the cutting of the first disc.

Figure 4:
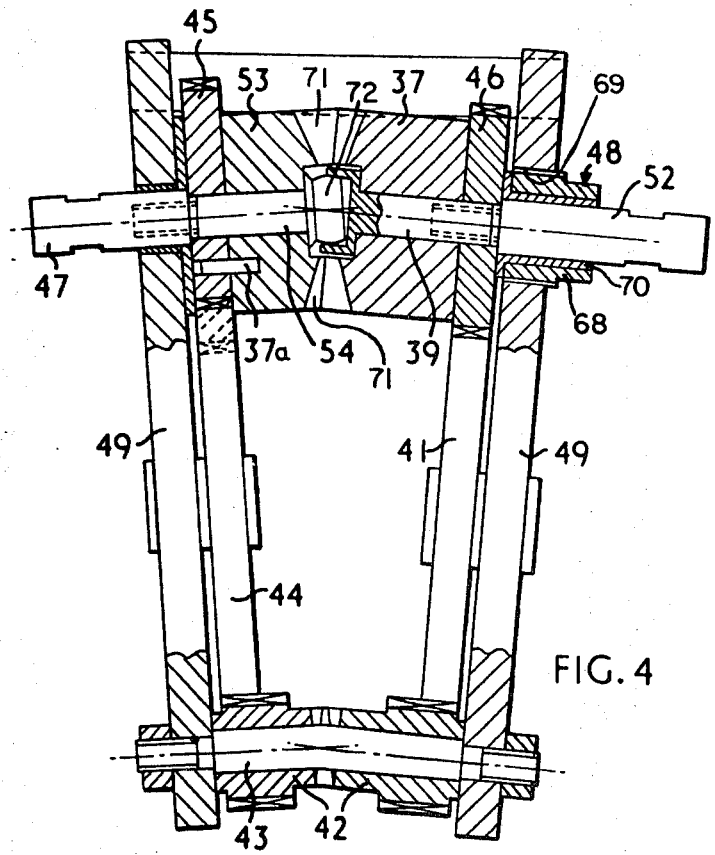
FIG. 4 is a part section detailing the mechanism necessary to form the teeth on a blank to form the second toothed member.

Once the blank for the mating disc has been rough cut in this way, the apparatus shown in FIG. 4 is employed to drive together the rough cut blank and the cutting tool to produce the desired finished mating disc.

The frame of the machine is constituted by two side members 49 joined together by spacer members at the angle shown.

The mating disc blank 37 is mounted for rotation with a spur gear 46 on a shaft 39.

The shaft 39 is mounted for rotation on one of the frame members 49 by means of a feed screw arrangement 48 which enables the mating disc 37 to be advanced away from its supporting frame member 49. The feed screw arrangement 48 incorporates an externally threaded sleeve 68, the threads of which engage in a correspondingly internally threaded bore 69 in frame member 49. The sleeve 68 incorporates a bearing member 70 in its internal bore, the bearing member serving to hold the shaft 52 on its axis and also serving as a thrust bearing engaging the rear face of a gear 46. In order to operate the feed screw arrangement to drive the mating disc 37 and gear 46 further into mesh with the tool 53 the sleeve 68 is rotated in such a manner that it is advanced towards the tool 53 by means of the external thread on the sleeve 68 cooperating with the internally threaded bore 69, thereby moving the shaft 46 and blank 37 in an axial direction to the desired extent. The shaft 39 is drivable through an input shaft 52 provided with a gear 46. An idler gear 41 mounted on the frame member 49 transfers the drive from gear 46 to one of a pair of gears 42 which are mounted on a cranked shaft 43 extending between the two frame members 49. The two gears 42 are inter-connected by means of a flexible drive. The second gear 42 drives a further gear 45 through a further idler 44. The gear 45 is mounted for rotation opposite the gear 46 on the other frame member 49. The gear 46 is disposed on the input shaft 52 in such a way that no backlash exists in the train of gears 46, 41, 42, 44 and 45. The cutting tool 53 is mounted for rotation with the gear 45 on a shaft 54 with a drive-pin 37a. The cutting tool 53 incorporates a front face directed towards the disc 37 having a series of serrated teeth 71 having serrations of the form disclosed in FIG. 3. The two shafts 39 and 54 are supported at their inner ends by a ball and socket coupling 72. Shaft 54 is driven by means of a further input shaft 47.

Thus, the cutting tool 53 and mating disc 37 are coupled together through a gear train and are mutually inclined to each other at the angle of inclination between the frame members 49. The two gears 42 have the same number of teeth and idler gear 41 may have the same number of teeth as idler 44. In this case the ratio of teeth on gears 45 and 46 corresponds to the ratio of teeth on the cutting tool 53 and disc 37. By means of this apparatus the cutting tool 53 and mating disc 37 may be caused to rotate in mesh in a manner corresponding to the meshing engagement of a mating disc 37 with a machined disc in a rotary positive displacement unit.

In use, the apparatus of FIG. 4 is driven alternately through input shaft 52 or input shaft 47 to cut both opposite faces of each lobe of the mating disc. Initially, the cutting tool 53 and disc 37 are spaced apart beyond the desired mating position, but as cutting progresses the feed mechanism 48 is used to move the two parts together until the swash plate motion of the mating disc 37 takes place about the common centre defined by the cutting tool 53. This completes the forming of the lobes of the mating disc. Any other simple machining operations which may be required to bring the mating disc as a whole to a suitable shape for insertion in a rotary positive displacement unit may then be carried out. This may include the machining of a part-spherical rear face such as the face 62 shown in FIG. 1.

The apparatus of FIG. 4 may be used on a production basis with a single cutting tool to form the teeth on a series of mating discs, thus the present invention allows the manufacture of rotary positive displacement units of the kind specified on a practical production basis.

I claim:

1. Apparatus for forming a second toothed member of a rotary positive displacement unit, wherein said unit includes a first toothed member having teeth extending axially from one face thereof in mesh with teeth extending axially from one face of said second toothed member and there being one less tooth on one of said members than the other of said members and the toothed members being movable relatively to each other in a combined rotary motion and a tilting swash plate type of action; said apparatus comprising a cutting tool having teeth of a similar configuration to said first toothed member and having cutting portions on said teeth;
first and second shafts being rotatably supported in an opposed relationship, said tool and a work blank being securely mounted on said first and second shafts, respectively, the axis of said shafts being in substantially the same plane and being inclined to each other at an angle corresponding to the angle of said tilting action, drive means providing relative speeds of rotation of said tool and said blank in proportion to the number of teeth on said tool and the number of teeth to be formed on said blank, and means for axially feeding said tool and said blank relatively towards each other,
whereby teeth are cut in said blank that mesh with said cutting tool and thereby are the appropriate configuration to mesh with the teeth on said first member.

2. Apparatus according to claim 1 wherein the first shaft is drivably connected to the second shaft by means of a gear train to enable the first shaft to rotate relatively with respect to the second shaft.

3. Apparatus according to claim 1 wherein a feed mechanism is associated with one of the shafts to cause the cutting tool and the blank to move together as cutting progresses.

4. Apparatus according to claim 1 wherein the two shafts are supported at their inner ends by a ball and socket coupling.

5. In a method of forming a second toothed member of a rotary positive displacement unit, wherein said unit includes a first toothed member having teeth extending axially from one face thereof in mesh with teeth extending axially from one face of said second toothed member and there being one less tooth on one of said members than the other of said members and the toothed members being movable relatively to each other in a combined rotary motion and a tilting swash plate type of action; said method comprising the steps of:
forming a cutting tool having teeth of a similar configuration to the first toothed member and having cutting portions on said teeth, rotating said cutting tool about a first fixed axis, rotating a blank for said second toothed member about a second fixed axis inclined to said first axis at an angle corresponding to the angle of said tilting action, providing relative speeds of rotation of said tool and said blank in proportion to the numbers of teeth on said tool and the number of teeth to be formed on said blank, and axially feeding said tool and said blank relatively towards each other, whereby teeth are cut in said blank that mesh with said cutting tool and thereby are the appropriate configuration to mesh with the teeth on said first member.

6. A method according to claim 5 including the step of forming each tooth of the cutting tool for the second tooth member with serrations.

7. A method according to claim 5 including the step of machining the blank to remove as much metal as is practicable before running the cutting tool in contact with the blank.

8. A method according to claim 5 including the step of supplying drive alternately to the cutting tool and then to the blank during running of the cutting tool in contact with the blank.

References Cited

UNITED STATES PATENTS

| 2,718,793 | 9/1955 | Hawthorne | 90—1X |
| 2,772,602 | 12/1956 | Christman | 90—1.4 |
| 3,499,367 | 3/1970 | Glocker | 90—1X |

GIL WEIDENFELD, Primary Examiner

U.S. Cl. X.R.

90—5, 9.4